US009880432B2

(12) United States Patent
Lim et al.

(10) Patent No.: US 9,880,432 B2
(45) Date of Patent: Jan. 30, 2018

(54) DISPLAY SUBSTRATE (71) Applicant: Samsung Display Co., Ltd., Yongin (KR)

(72) Inventors: Jae-Keun Lim, Suwon-si (KR); Ji-Sun Kim, Seoul (KR); Young-Wan Seo, Suwon-si (KR); Chong-Chul Chai, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 296 days.

(21) Appl. No.: 14/528,499

(22) Filed: Oct. 30, 2014

(65) Prior Publication Data

US 2015/0293417 A1   Oct. 15, 2015

(30) Foreign Application Priority Data

Apr. 10, 2014  (KR) .......................... 10-2014-0042990

(51) Int. Cl.
*H01H 47/00* (2006.01)
*H05F 3/00* (2006.01)
*H05F 3/02* (2006.01)
*G02F 1/1362* (2006.01)
*G02F 1/1345* (2006.01)

(52) U.S. Cl.
CPC .... *G02F 1/136204* (2013.01); *G02F 1/13452* (2013.01)

(58) Field of Classification Search
CPC . G02F 1/1345; G02F 1/1368; G02F 1/136204
USPC ....................................................... 361/220
See application file for complete search history.

(56) References Cited

U.S. PATENT DOCUMENTS

| 5,744,837 | A  | * | 4/1998  | Kamiura | ........... | G02F 1/136204 257/355 |
| 6,081,307 | A  | * | 6/2000  | Ha      | ..................... | G02F 1/136204 349/40 |
| 7,012,664 | B2 | * | 3/2006  | Moon    | ................. | G02F 1/13452 349/139 |
| 7,280,327 | B2 | * | 10/2007 | Lai     | ........................ | G02F 1/1345 257/335 |
| 7,514,713 | B2 | * | 4/2009  | Tsai    | ...................... | G02F 1/1345 257/208 |

(Continued)

FOREIGN PATENT DOCUMENTS

| JP | 09-22948 | 1/1997 |
| JP | 2001-135897 | 5/2001 |

(Continued)

*Primary Examiner* — Ronald W Leja
*Assistant Examiner* — Lucy Thomas
(74) *Attorney, Agent, or Firm* — H.C. Park & Associates, PLC (57) ABSTRACT A display substrate includes a base substrate including a display area in which signal lines and pixels are arranged and a peripheral area surrounding the display area, pads disposed in the peripheral area and receiving an electrical signal, fan-out lines connecting the pads and the signal lines, and static electricity breakup circuits comprising a breakup line that crosses the fan-out lines, and static electricity prevention circuits respectively connected to the fan-out lines. Parts of the static electricity prevention circuits are connected to adjacent fan-out lines and are commonly connected to the one of the breakup lines through a common contact part.

10 Claims, 8 Drawing Sheets

(56) References Cited

U.S. PATENT DOCUMENTS

| | | | |
|---|---|---|---|
| 7,679,693 B2 | 3/2010 | Park | |
| 7,957,110 B2 * | 6/2011 | Wang | G02F 1/136204 361/111 |
| 8,222,644 B2 * | 7/2012 | Yang | G02F 1/1345 257/59 |
| 8,427,879 B2 * | 4/2013 | Chang | G11C 16/0466 365/182 |
| 8,462,307 B2 * | 6/2013 | Kook | G02F 1/13458 345/104 |
| 8,879,039 B2 * | 11/2014 | Kim | G02F 1/1345 349/149 |
| 9,025,124 B2 * | 5/2015 | Kim | H01L 27/1288 349/149 |
| 2004/0233345 A1 * | 11/2004 | Park | G02F 1/136204 349/40 |
| 2006/0145951 A1 * | 7/2006 | Watanabe | G02F 1/136204 345/55 |
| 2007/0057977 A1 * | 3/2007 | Shih | G02F 1/133308 347/2 |
| 2008/0049156 A1 * | 2/2008 | Kim | G02F 1/136286 349/40 |
| 2008/0106207 A1 * | 5/2008 | Yoon | G09G 3/3233 315/158 |
| 2008/0157364 A1 * | 7/2008 | Yang | G02F 1/1345 257/741 |
| 2010/0109993 A1 * | 5/2010 | Chang | G02F 1/1345 345/92 |
| 2011/0012887 A1 * | 1/2011 | Lee | G09G 3/3648 345/212 |
| 2011/0156992 A1 * | 6/2011 | Moon | G09G 3/3607 345/84 |
| 2012/0182513 A1 * | 7/2012 | Kim | G02F 1/1343 349/143 |
| 2012/0281159 A1 * | 11/2012 | Chen | G02F 1/1345 349/40 |
| 2013/0161687 A1 | 6/2013 | Abou-Khalil et al. | |
| 2014/0092078 A1 * | 4/2014 | Yoon | G09G 5/001 345/212 |
| 2014/0176838 A1 * | 6/2014 | Hong | G02F 1/134363 349/33 |
| 2015/0077407 A1 * | 3/2015 | Kim | G09G 3/3611 345/204 |

FOREIGN PATENT DOCUMENTS

| | | |
|---|---|---|
| JP | 2008-060356 | 3/2008 |
| JP | 2008-191470 | 8/2008 |
| KR | 10-2005-0106926 | 11/2005 |

* cited by examiner

DISPLAY SUBSTRATE

This application claims priority from and the benefit of Korean Patent Application No. 10-2014-0042990, filed on Apr. 10, 2014, which is hereby incorporated by reference for all purposes as if fully set forth herein.

BACKGROUND

Field

Exemplary embodiments of the inventive concept relate to a display substrate having a high resolution.

Discussion of the Background

Generally, a liquid crystal display ("LCD") panel includes an array substrate, an upper substrate facing the array substrate, and a liquid crystal layer interposed between the array substrate and the upper substrate. The array substrate includes a display area in which a plurality of lines and a plurality of thin-film transistors connected to the lines are formed, and a peripheral area in which pads applying an electric signal to the lines are formed.

After the array substrate is manufactured, an array test process is performed to inspect the lines for defects. Array test pads are formed on a mother substrate of the array substrate for the array test process. The array test pads are electrically connected to the lines. The array test process inspects the lines for defects by applying a test signal through the array test pads.

During driving of the LCD panel for the array test process and manufacturing of the LCD panel, static electricity may flow through the array test pads, so that the lines and the thin-film transistors that are formed on the array substrate may be damaged. Therefore, the static electricity may cause a decrease in manufacturing yield and a reduction of product quality.

The above information disclosed in this Background section is only for enhancement of understanding of the background of the inventive concept, and, therefore, it may contain information that does not constitute prior art.

SUMMARY

The accompanying drawings, which are included to provide a further understanding of the invention and are incorporated in and constitute a part of this specification, illustrate embodiments of the invention, and together with the description serve to explain the principles of the invention.

Additional aspects will be set forth in the detailed description which follows, and, in part, will be apparent from the disclosure, or may be learned by practice of the inventive concept.

Exemplary embodiments of the inventive concept provide a display substrate including a circuit area in which a static electricity breakup circuit is formed for a high-resolution display panel.

According to an exemplary embodiment of the inventive concept, there is provided a display substrate. The display substrate includes a base substrate comprising a display area in which signal lines and pixels are arranged, and a peripheral area surrounding the display area. The display substrate also includes pads disposed in the peripheral area to receive an electrical signal, fan-out lines connecting the pads and the signal lines, and a static electricity breakup circuit comprising a breakup line that crosses the fan-out lines, and static electricity prevention circuits respectively connected to the fan-out lines. The static electricity prevention circuits are commonly connected to the breakup line through a common contact.

According to the inventive concept, static electricity diodes connected to adjacent fan-out lines are commonly connected to the breakup line through the common contact, and thus, the circuit area in which each of the static electricity prevention circuits is formed may be decreased. Therefore, the circuit area may be including a high-resolution display apparatus having a narrow pixel distance.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
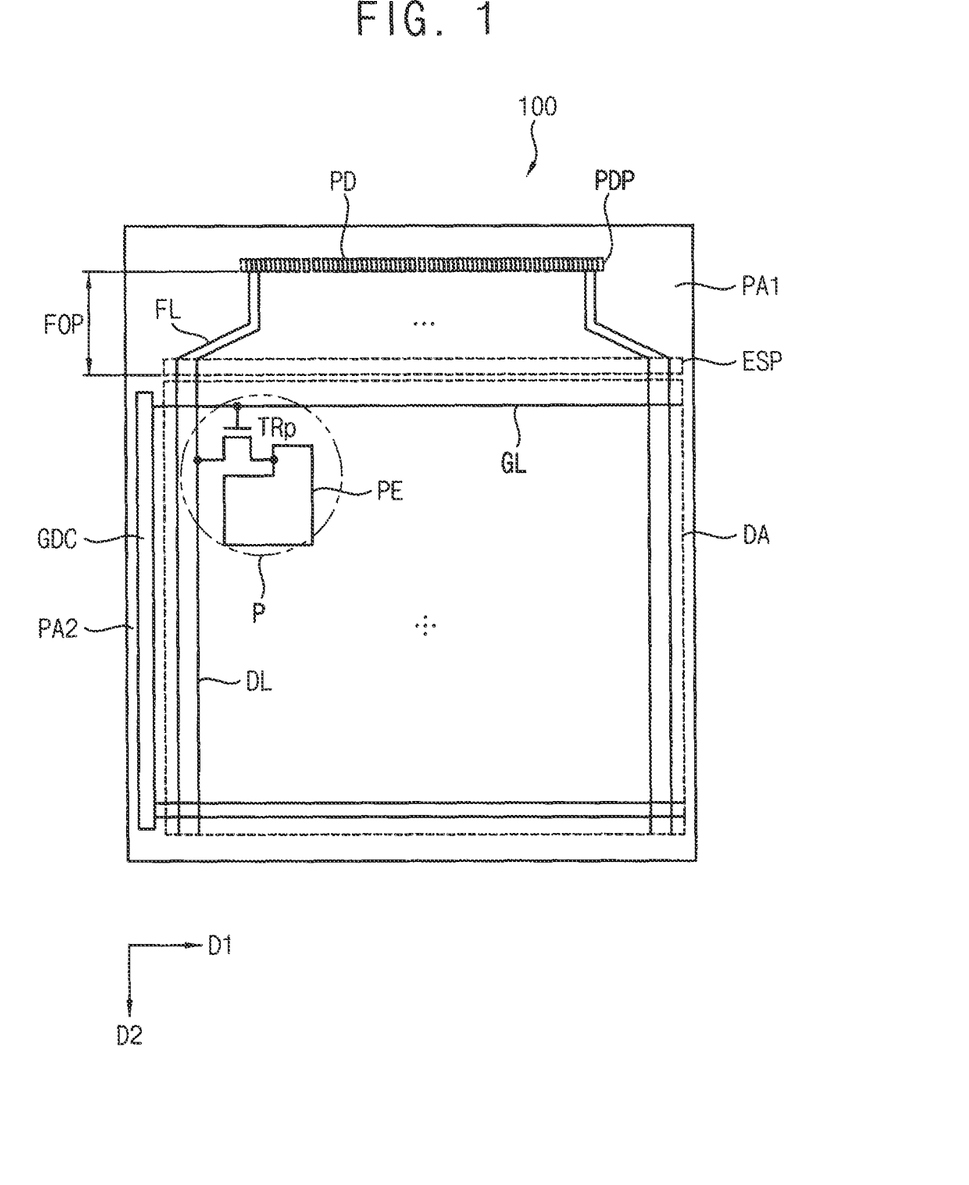
FIG. 1 is a plan view illustrating a display substrate according to an exemplary embodiment.

FIG. 1 is a plan view illustrating a display substrate according to an exemplary embodiment. Referring to FIG. 1, the display substrate 100 includes a display area DA and first and second peripheral areas PA1 and PA2 surrounding the display area DA. The first peripheral area PA1 is adjacent to a first side of the display area DA, and the second peripheral area PA2 is adjacent to a second side of the display area DA.

The display substrate 100 includes signal lines, including data lines DL and gate lines GL disposed in the display area DA. The display substrate 100 includes pixels P disposed in the display area DA.

The gate lines GL extend in a first direction D1 and are arranged in a second direction D2 crossing the first direction D1. The data lines DL extend in the second direction D2 and are arranged in the first direction D1.

The pixels P are arranged as a matrix that includes pixel rows arranged in the second direction D2 and pixel columns arranged in the first direction D1. Each of the pixels P includes a pixel transistor TRp which is connected to a gate line GL and a data line DL and a pixel electrode PE which is connected to the pixel transistor TRp.

The display substrate 100 includes the first peripheral area PA1 in which a pad part PDP, a fan-out part FOP and a static electricity breakup circuit ESP are disposed.

The pad part PDP includes pads PD which is electrically connected to bumps of an external device. The pads PD includes input pads that receive electrical signals from the external device, and output pads that output the electrical signals. The pads PD are arranged in the first direction D1.

The fan-out part FOP includes fan-out lines FL which connects the output pads of the pad part PDP and the data lines DL.

The static electricity breakup circuit ESP dissipates static electricity accumulated during manufacturing and driving processes, such that the data lines DL, the gate lines GL, and the pixel transistors TRp may be prevented from being damaged by the static electricity.

The static electricity breakup circuit ESP includes static electricity prevention circuits that are respectively connected to the fan-out lines FL. Each of the static electricity prevention circuits may include a static electricity diode and a static electricity capacitor.

The display substrate 100 includes the second peripheral area PA2 in which the gate driver circuit GDC is disposed. The gate driver circuit GDC includes circuit transistors, and sequentially provides the gate lines GL with gate signals. The circuit transistors may be directly formed in the second peripheral area PA2 via substantially the same process used to form the pixel transistors TRp.

Figure 2A:
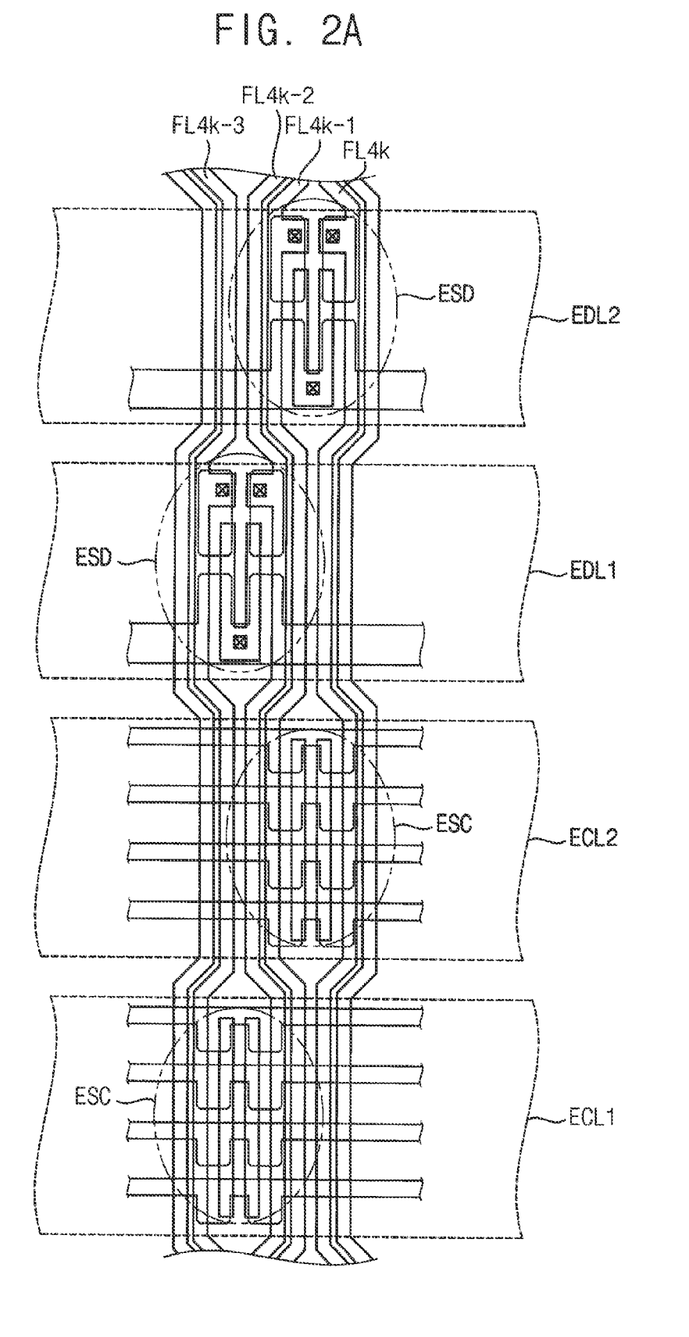
FIGS. 2A and 2B are expanded views illustrating the display substrate of FIG. 1.
Figure 2B:
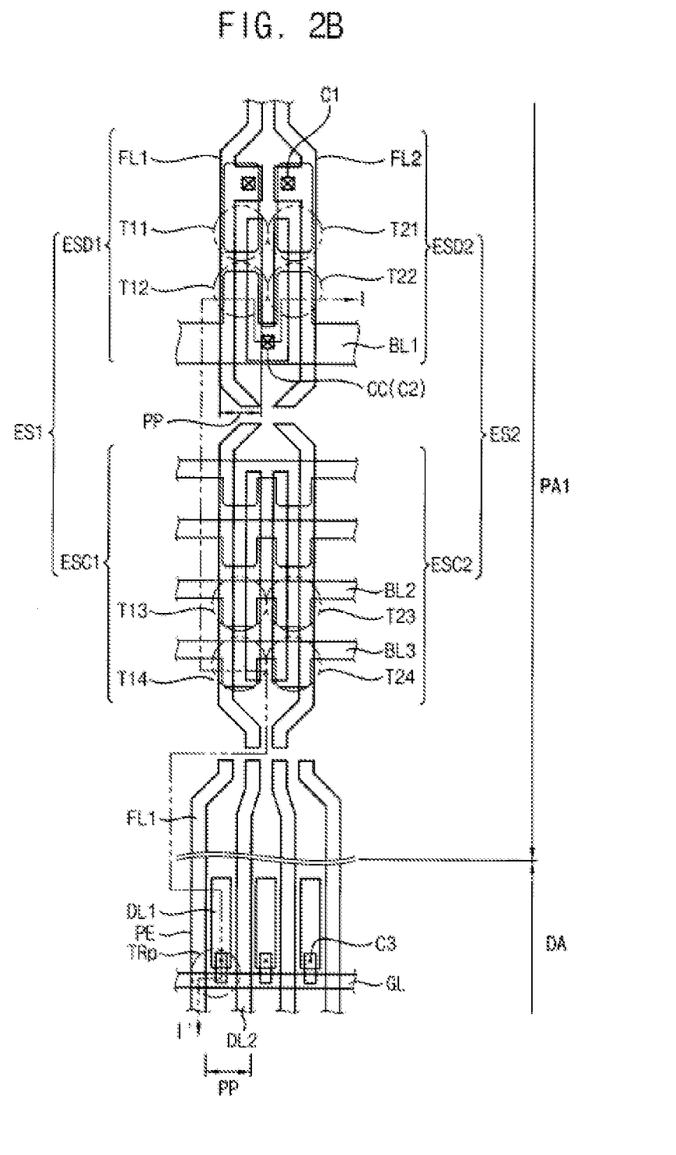
Figure 3:
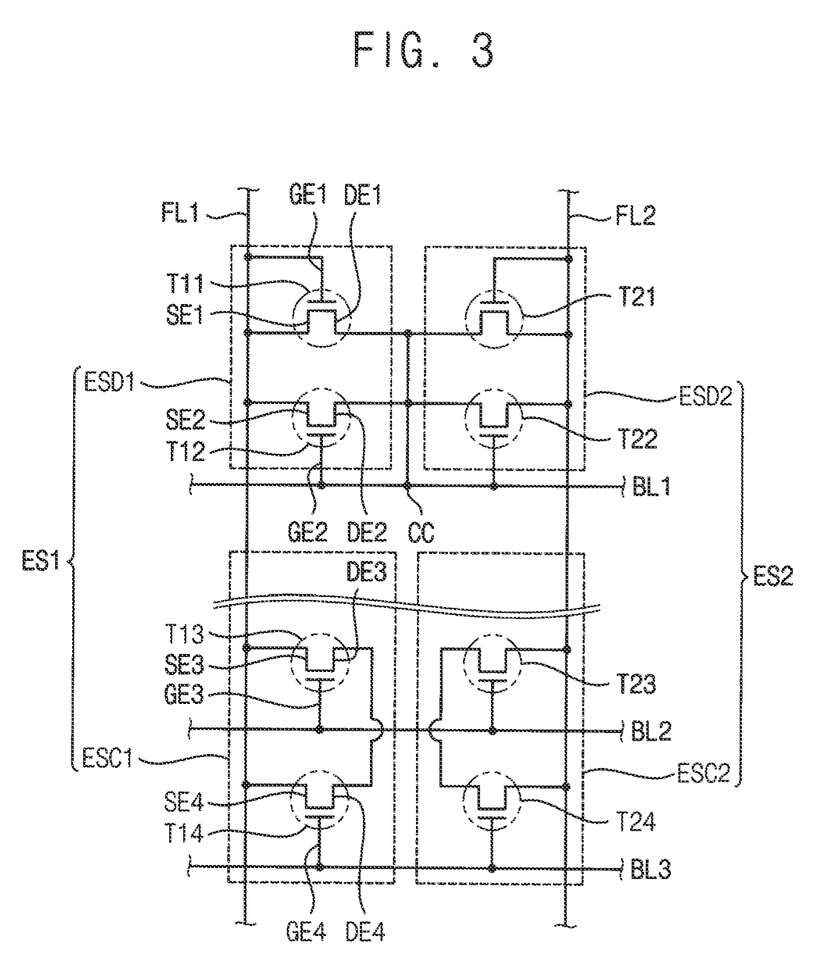
FIG. 3 is an equivalent circuit diagram illustrating a static electricity breakup circuit of FIG. 2B.

FIGS. 2A and 2B are expanded views illustrating the display substrate of FIG. 1. FIG. 3 is an equivalent circuit diagram illustrating a static electricity breakup circuit of FIG. 2B. Referring to FIG. 2A, the static electricity breakup circuit ESP may include at least two static electricity diode rows EDL1 and EDL2, and at least two static electricity capacitor rows ECL1 and ECL2, which extend in the first direction D1 crossing the fan-out lines FL.

For example, a first static electricity diode row EDL1 includes static electricity diodes ESD, which are respectively connected to (4k-3)-th and (4k-2)-th fan-out lines FL4k-3 and FL4k-2. A second static electricity diode row EDL2 includes static electricity diodes ESD which are respectively connected to (4k-1)-th and (4k)-th fan-out lines FL4k-1 and FL4k (wherein, "k" is a natural number). The second static electricity diode row EDL2 may be disposed adjacent to the first static electricity diode row EDL1.

In addition, a first static electricity capacitor row ECL1 includes static electricity capacitors ESC, which are respectively connected to the (4k-3)-th and (4k-2)-th fan-out lines FL4k-3 and FL4k-2. A second static electricity capacitor row ECL2 includes static electricity capacitors ESC, which are respectively connected to the (4k-1)-th and (4k)-th fan-out lines FL4k-1 and FL4k (wherein, "k" is a natural number). The second static electricity capacitor row ECL2 may be disposed adjacent to the first static electricity capacitor row ECL1.

At least one static electricity capacitor row may be disposed in at least one of an upper area and a lower area of the static electricity diode row. Alternatively, static electricity capacitor rows may be disposed in both upper and lower areas of the static electricity diode row. The static electricity capacitors may be disposed adjacent to both terminals of the static electricity diode.

FIG. 2B is an expansion view of the static electricity prevention circuits which are connected to the (4k-1)-th and (4k)-th fan-out lines FL4k-1 and FL4k of FIG. 2A. Referring to FIGS. 2B and 3, the static electricity breakup circuit ESP includes breakup lines BL1, BL2, and BL3, which cross the fan-out lines FL1 and FL2, and static electricity prevention circuits ES1 and ES2 that are respectively connected to the fan-out lines FL1 and FL2. Each of the static electricity prevention circuits may include a static electricity diode and a static electricity capacitor.

The breakup lines BL1, BL2 and BL3 are electrically floated and are provided with a DC voltage of a predetermined level. Each of the static electricity prevention circuits ES1 and ES2 may include at least one static electricity diode and at least one static electricity capacitor.

A first static electricity prevention circuit ES1 is connected to a first fan-out line FL1. The first static electricity prevention circuit ES1 includes a first static electricity diode ESD1 and a first static electricity capacitor ESC1.

The first static electricity diode ESD1 may include first and second transistors T11 and T12. The first transistor T11 includes a first gate electrode GE1, a first source electrode SE1, and a first drain electrode DE1. The first gate electrode GE1 is connected to the first fan-out line FL1. The first source electrode SE1 is connected to the first fan-out line FL1. The first drain electrode DE1 is connected to a common contact part CC.

The second transistor T12 includes a second gate electrode GE2, a second source electrode SE2, and a second drain electrode DE2. The second gate electrode GE2 is connected to a first breakup line BL1, the second source electrode SE2 is connected to the first fan-out line FL1, and the second drain electrode DE2 is connected to the common contact part CC.

The first static electricity capacitor ESC1 may include third and fourth transistors T13 and T14. The third transistor T13 includes a third gate electrode GE3, a third source electrode SE3, and a third drain electrode DE3. The fourth transistor T14 includes a fourth gate electrode GE4, a fourth source electrode SE4, and a fourth drain electrode DE4.

The third gate electrode GE3 is connected to a second breakup line BL2, the third source electrode SE3 is connected to the first fan-out line FL1, and the third drain electrode DE3 is connected to the fourth drain electrode DE4. The fourth gate electrode GE4 is connected to a third breakup line BL3, the fourth source electrode SE4 is connected to the first fan-out line FL1, and the fourth drain electrode DE4 is connected to the third drain electrode DE3 of the third transistor T13.

A second static electricity prevention circuit ES2 is connected to a second fan-out line FL2. The second static electricity prevention circuit ES2 includes a second static electricity diode ESD2 and a second static electricity capacitor ESC2.

The second static electricity diode ESD2 may include first and second transistors T21 and T22. The second static electricity diode ESD2 has a back to back structure with the first static electricity diode ESD1, and is symmetrical with the first static electricity diode ESD1 with respect to the common contact part CC.

As shown in FIG. 3, a first gate electrode of the first transistor T21 is connected to the second fan-out line FL2, the first source electrode of the first transistor T21 is connected to the second fan-out line FL2 and the first drain electrode of the first transistor T21 is connected to the common contact part CC.

The second gate electrode of the second transistor T21 is connected to the first breakup line BL1, the second source electrode of the second transistor T21 is connected to the second fan-out line FL2, and the second drain electrode of the second transistor T21 is connected to the common contact part CC.

The second static electricity capacitor ESC2 may include third and fourth transistors T23 and T24. The second static electricity capacitor ESC2 is arranged back to back structure with the first static electricity capacitor ESC1.

The third transistor T23 includes a third gate electrode, a third source electrode, and a third drain electrode. The fourth transistor T24 includes a fourth gate electrode, a fourth source electrode, and a fourth drain electrode.

The third gate electrode of the third transistor T23 is connected to the second breakup line BL2, the third source electrode of the third transistor T23 is connected to the second fan-out line FL2, and the third drain electrode of the third transistor T23 is connected to the fourth drain electrode of the fourth transistor T24.

The fourth gate electrode of the fourth transistor T24 is connected to a third breakup line BL3, the fourth source electrode of the fourth transistor T24 is connected to the second fan-out line FL2, and the fourth drain electrode of the fourth transistor T24 is connected to the third drain electrode of the third transistor T23.

As shown in FIGS. 2B and 3, the first static electricity prevention circuit ES1 connected to the first fan-out line FL1 and the second static electricity prevention circuit ES2 connected to the second fan-out line FL2, are commonly connected to the first breakup line BL1 through the common contact part CC.

The first and second static electricity diodes ESD1 and ESD2 are commonly connected through the common contact part CC, such that a size of a circuit area in which a static electricity prevention circuit is formed, may be decreased. The circuit area of the static electricity prevention circuit corresponds to a pixel distance PP between adjacent signal lines, for example, between adjacent data lines in the display area. Therefore, in a high-resolution display apparatus having a narrow pixel distance PP, the static electricity prevention circuit may be easily formed.

According to an exemplary embodiment, in a high-resolution display apparatus having a narrow pixel distance PP, and the circuit area in which a static electricity prevention circuit is formed, may be obtained.

Figure 4:
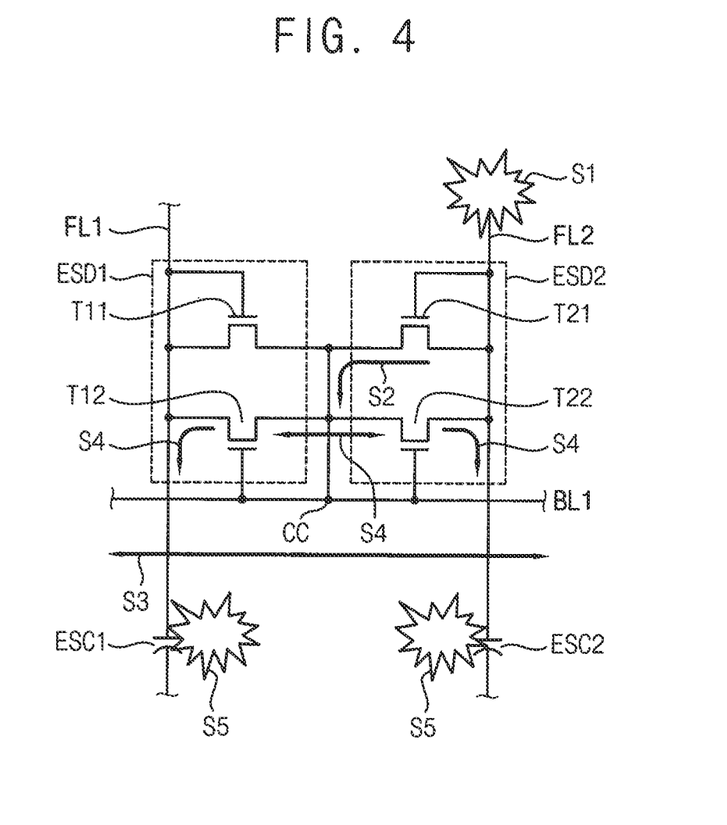
FIG. 4 is a conceptual diagram illustrating the static electricity breakup circuit of FIG. 2B.

FIG. 4 is a conceptual diagram illustrating the static electricity breakup circuit of FIG. 2B. Referring to FIGS. 3 and 4, when the static electricity flows into a second fan-out line FL2 during processes of the display substrate (51), the first transistor T21 of the second static electricity diode ESD2, which is connected to the second fan-out line FL2, receives the static electricity (S2). The static electricity applied to the first transistor T21 of the second static electricity diode ESD2 is transferred to the first breakup line BL1 through the common contact part CC (S3). The static electricity applied to the first breakup line BL1 is transferred to the second transistor T22 of the first static electricity diode ESD1, which is disposed in a lower side of the first transistor T21 of the second static electricity diode ESD2 (S4).

The static electricity applied to the second transistor T22 of the second static electricity diode ESD2 is transferred to the second static electricity capacitor ESC2. The static electricity applied to the second static electricity capacitor ESC2 is broken up (S5). In addition, the static electricity applied to the second transistor T12 of the first static electricity diode ESD1 is transferred to the first static electricity capacitor ESC1 (S4). The static electricity applied to the first static electricity capacitor ESC1 is broken up (S5).

As described above, the static electricity flowing during the processes of the display substrate is broken up through the static electricity breakup circuit. Thus, damage to the data line, the gate line, and the pixel transistor of the display substrate caused by static electricity may be prevented from being damaged by the static electricity.

Figure 5A:
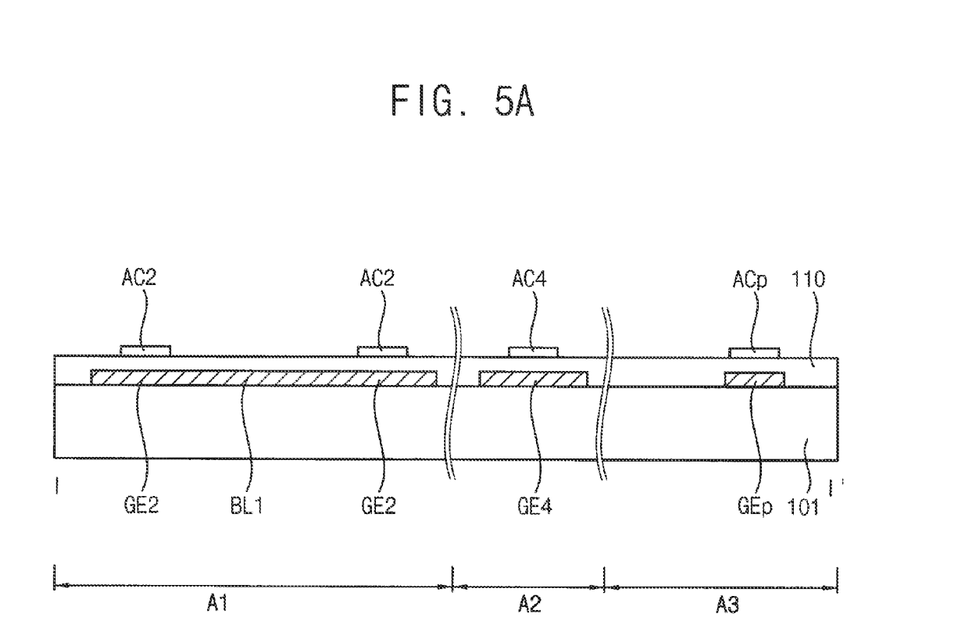
FIGS. 5A to 5C are cross-sectional views illustrating a method of manufacturing the display substrate taken along line I-I' of FIG. 2B.

FIGS. 5A to 5C are cross-sectional views illustrating a method of manufacturing the display substrate taken along the line I-I' of FIG. 2B. Referring to FIGS. 1, 2B and 5A, a first metal layer is formed on a base substrate 101. The first metal layer is patterned to form gate lines GL and breakup lines BL1, BL2, and BL3. In addition, the first metal layer is patterned to form gate electrodes of the transistors in the static electricity diode, the static electricity capacitor, and the pixel transistors.

As shown in FIG. 5A, the second gate electrodes GE2 of the second transistors T12 and T22 are formed in a first area A1, the fourth gate electrode GE4 of the fourth transistor T14 is formed in a second area A2, and the gate electrode GEp of the pixel transistor TRp is formed in a third area A3.

Referring to FIGS. 2B and 5A, the second gate electrodes GE2 of the second transistors T12 and T22 may extend from the first breakup line BL1 and be connected to the first breakup line BL1. The third gate electrodes GE3 of the static electricity capacitor may extend from the second breakup line BL and be connected to the second breakup line BL2. The fourth gate electrodes GE4 of the static electricity capacitor may extend from the third breakup line BL3 and be connected to the third breakup line BL3.

A gate insulating layer 110 is formed on the base substrate 101, on which the gate electrodes GE2, GE4, and GEp are formed.

A semiconductor layer is formed on the base substrate 101 on which the gate insulating layer 110 is formed. The semiconductor layer is patterned to form semiconductor patterns of the transistors in the static electricity diode, and the static electricity capacitor and the pixel transistors.

As shown in FIG. 5A, second semiconductor patterns AC2 of the second transistors T12 and T22 are formed in the first area A1, a fourth semiconductor pattern AC4 of the fourth transistor T14 is formed in the second area A2, and a semiconductor pattern ACp of the pixel transistor TRp is formed in the third area A3.

The semiconductor layer may include an oxide semiconductor layer. The oxide semiconductor layer may include an amorphous oxide having at least one of indium (In), zinc (Zn), gallium (Ga), tin (Sn), and hafnium (HF). For example, the oxide semiconductor layer may include an amorphous oxide having indium (In), zinc (Zn) and gallium (Ga), or an amorphous oxide having indium (In), zinc (Zn) and hafnium (HF). For example, the oxide semiconductor layer may include indium zinc oxide (InZnO), indium gallium oxide (InGaO), indium tin oxide (InSnO), tin zinc oxide (ZnSnO), tin gallium oxide (GaSnO), or tin gallium oxide (GaZnO). Alternatively, the semiconductor layer may include amorphous silicon.

Figure 5B:
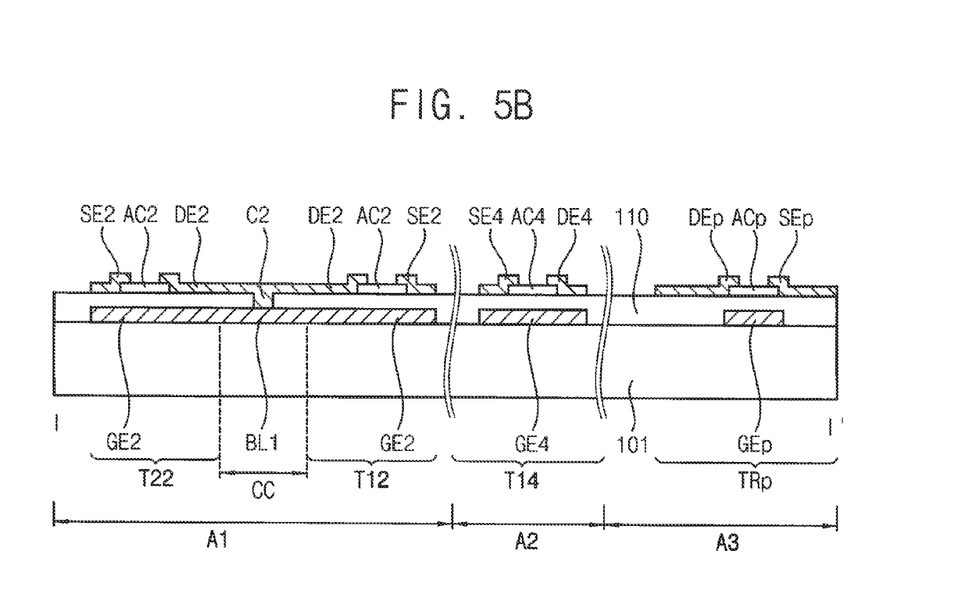

Referring to FIGS. 1, 2B, and 5B, once the semiconductor pattern is formed, the gate insulating layer 110 is etched to form first and second contact holes C1 and C2. The first contact hole C1 may be formed in areas in which the first transistors T11 and T12 of the static electricity diode are formed. The first contact hole C1 exposes each of the first gate electrodes GE1 of the first transistors T11 and T12.

The second contact hole C2 exposes the first breakup line BL1, which is directly connected to the second gate electrodes GE2 of the second transistors T12 and 22. As shown in FIG. 5B, the second contact hole C2 is formed in the first area A1 and exposes the first breakup line BL1.

A second metal layer is formed on the base substrate 101 on which the contact holes C1 and C2 are formed. The second metal layer is patterned to form data lines DL and fan-out lines FL. In addition, the second metal layer is patterned to form source electrodes and drain electrodes of the transistors in the static electricity diode, the static electricity capacitor, and the pixel transistors.

As shown in FIG. 5B, the second source electrodes SE2 and the second drain electrodes DE2 of the second transistors T12 and T22 are formed in the first area A1, the fourth source electrode SE4 and the fourth drain electrode DE4 of the fourth transistor T14 are formed in the second area A2, and the source electrode SEp and the drain electrode DEp of the pixel transistor TRp are formed in the third area A3.

Referring to FIG. 2B, the first gate electrodes GE1 of the first transistors T11 and T12 are directly connected to the first and second fan-out lines FL1 and FL2, through the first contact holes C1.

Referring to FIGS. 2B and 5B, the second drain electrodes DE2 of the second transistors T12 and T22 are directly connected to the first breakup line BL1 through the second contact hole C2. Thus, the common contact part CC may be at least partially defined by the second contact hole C2 formed on the first breakup line BL1.

Figure 5C:
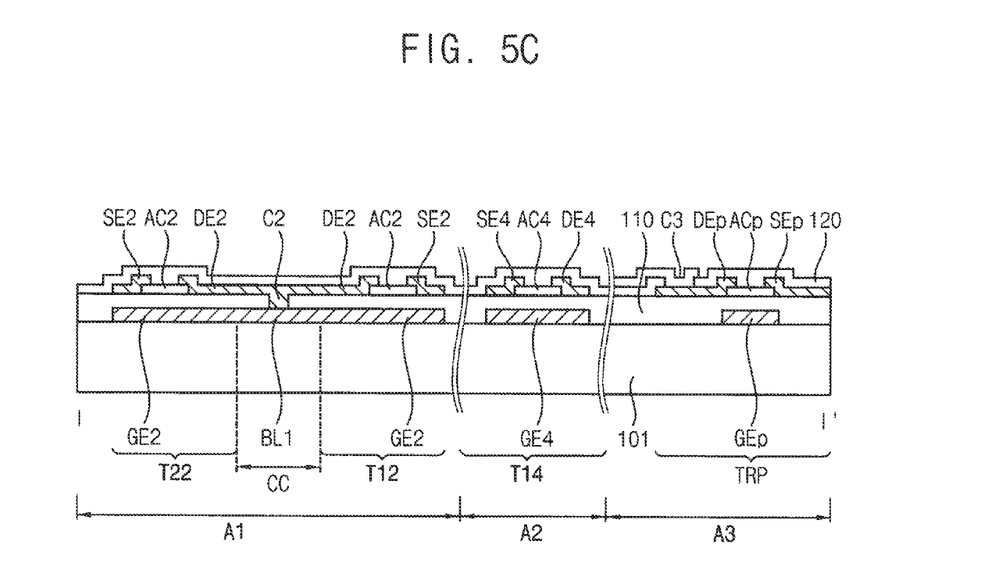

Referring to FIGS. 1, 2B, and 5C, a protecting layer 120 is formed on the base substrate 101 on which the source electrodes SE2, SE4, and SEp and the drain electrodes DE2, DE4, and DEp are formed. The protecting layer 120 covers the semiconductor pattern in an area between the source electrode and the drain electrode.

Then, the protecting layer 120 is etched to form a third contact hole C3, which exposes the drain electrode DEp of the pixel transistor TRp.

A transparent conductive layer is formed on the base substrate 101 on which the third contact hole C3 is formed. The transparent conductive layer is patterned to from a pixel electrode PE. The pixel electrode PE is directly connected to the pixel transistor TRp through the third contact hole C3.

As described above, in the static electricity breakup circuit, an electrode formed using the first metal layer may be directly connected to an electrode formed using the second metal layer, through a contact hole.

The common contact part CC according to an exemplary embodiment has a direct contact structure that includes the second drain electrodes DE2 of the second transistors T12 and T22 formed using the second metal layer. The common contact part CC is directly connected to the first breakup line BL1 formed using the first metal layer, through the contact hole.

According to an exemplary embodiment, at least two adjacent static electricity diodes are commonly connected to the breakup line, through the common contact part CC. Thus, the circuit area in which each of the static electricity prevention circuits is formed may be decreased. Therefore, in a high-resolution display apparatus having a narrow pixel distance PP may be obtained.

Figure 6:
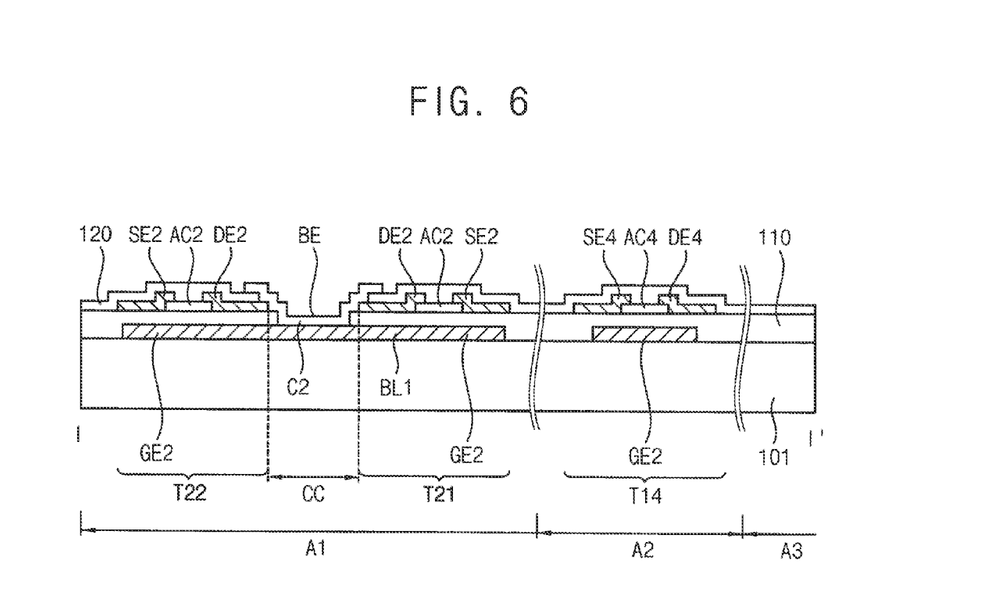
FIG. 6 is a section view illustrating a display substrate taken along line I-I' of FIG. 2B according to an exemplary embodiment.

FIG. 6 is a section view illustrating a display substrate taken along line I-I' of FIG. 2B, according to an exemplary embodiment. Hereinafter, the same reference numerals are used to refer to the same or like parts as those described in the previous exemplary embodiments, and a method of manufacturing the display substrate is explained.

Referring to FIGS. 2B, 5A, and 6, a first metal layer is formed on a base substrate 101. The first metal layer is patterned to form gate lines GL and breakup lines BL1, BL2, and BL3. The first metal layer is patterned to form the gate electrodes of the transistors in the static electricity diode, the static electricity capacitor, and the pixel transistors.

As shown in FIG. 5A, the second gate electrode GE2 of the second transistors T12 and T22 are formed in a first area A1, the fourth gate electrode GE4 of the fourth transistor T14 is formed in a second area A2, and the gate electrode GEp of the pixel transistor TRp is formed in a third area A3.

Referring to FIGS. 2B and 5A, the second gate electrodes GE2 of the second transistors T12 and T22 may extend from the first breakup line BL1 and be connected to the first breakup line BL1. The third gate electrodes GE3 of the static electricity capacitor may extend from the second breakup line BL2 and be connected to the second breakup line BL2. The fourth gate electrodes GE4 of the static electricity capacitor may extend from the third breakup line BL3 and be connected to the third breakup line BL3.

A gate insulating layer 110 is formed on the base substrate 101 on which the gate electrodes GE2, GE4, and GEp are formed. A semiconductor layer is formed on the base substrate 101 on which the gate insulating layer 110 is formed. The semiconductor layer is patterned to form semiconductor patterns of the transistors in the static electricity diode and the static electricity capacitor and the pixel transistors.

As shown in FIG. 5A, second semiconductor patterns AC2 of the second transistors T12 and T22 are formed in the first area A1, a fourth semiconductor pattern AC4 of the fourth transistor T14 is formed in the second area A2, and a semiconductor pattern ACp of the pixel transistor TRp is formed in the third area A3.

The semiconductor layer may include an oxide semiconductor layer. The oxide semiconductor layer may include the amorphous oxide having at least one of indium (In), zinc (Zn), gallium (Ga), tin (Sn), and hafnium (HF). For example, the oxide semiconductor layer may include an amorphous oxide having indium (In), zinc (Zn) and gallium (Ga), or an amorphous oxide having indium (In), zinc (Zn) and hafnium (HF). For example, the oxide semiconductor layer may include indium zinc oxide (InZnO), indium gallium oxide (InGaO), indium tin oxide (InSnO), tin zinc oxide (ZnSnO), tin gallium oxide (GaSnO), or tin gallium oxide (GaZnO). Alternatively, the semiconductor layer may include amorphous silicon.

Referring to FIGS. 2B, 5B, and 6, a second metal layer is formed on the base substrate 101 on which the semiconductor patterns are formed. The second metal layer is patterned to form data lines DL and fan-out lines FL. In addition, the second metal layer is patterned to form source electrodes and drain electrodes of the transistors in the static electricity diode, the static electricity capacitor and the pixel transistors.

The second source electrodes SE2 and the second drain electrodes DE2 of the second transistors T12 and T22 are formed in the first area A1, the fourth source electrode SE4 and the fourth drain electrode DE4 of the fourth transistor T14 are formed in the second area A2, and the source electrode SEp and the drain electrode DEp of the pixel transistor TRp are formed in the third area A3.

Referring to FIGS. 2B and 6, a protecting layer 120 is formed on the base substrate 101 on which the source electrodes SE2, SE4, and Sep, and the drain electrodes DE2, DE4, and DEp are formed. The protecting layer 120 covers the semiconductor pattern in a space between the source electrode and the drain electrode.

Then, the gate insulating layer 110 and the protecting layer 120 are etched to form second contact hole C2 which expose the second drain electrode DE2 of the second transistor T12 in the first static electricity diode ESD1, the second drain electrode DE2 of the second transistor T22 in the second static electricity diode ESD2, and the first breakup line BL1.

Although not shown in figures, the gate insulating layer 110 and the protecting layer 120 are etched to form first contact holes C1. Each of the first contact holes C1 exposes the first gate electrodes GE1 and the first drain electrodes DE1 of the first transistors T11 and T12. The protecting layer 120 is etched to form a third contact hole C3 which exposes the drain electrode DEp of the pixel transistor TRp.

Referring to FIGS. 5C and 6, a transparent conductive layer is formed on the base substrate 101 on which the contact holes C1, C2 and C3 are formed. The transparent conductive layer is patterned to form a bridge electrode BE, which connects the second drain electrodes DE2 of the second transistors T12 and T22 and the first breakup line BL1 through the second contact hole C2. The common contact part CC is at least partially defined by the bridge electrode BE, which connects the second drain electrodes DE2 and the first breakup line BL1 through the second contact hole C2.

The transparent conductive layer is patterned to form a pixel electrode PE. The pixel electrode PE is directly connected to the pixel transistor TRp through the third contact hole C3.

Although not shown in figures, the transparent conductive layer may be patterned to form a bridge electrode, which connects the first gate electrode GE1 and the first drain electrode DE1 of each of the first transistors T11 and T12 through the first contact holes C1.

As described above, in the static electricity breakup circuit, an electrode formed using the first metal layer may be connected to an electrode formed using the second metal layer, through the bridge electrode formed using the transparent conductive layer. The common contact part CC, according to an exemplary embodiment, has a bridge contact structure which includes the bridge electrode BE formed using the transparent conductive layer connecting the second drain electrodes DE2 of the second transistors T12 and T22, which are formed using the second metal layer, and the first breakup line BL1 formed using the first metal layer through the contact hole.

According to an exemplary embodiment, at least two adjacent static electricity diodes are commonly connected to the breakup line through the common contact part CC. Thus, the circuit area in which each of the static electricity prevention circuits is formed may be decreased. Therefore, in a high-resolution display apparatus having a narrow pixel distance PP may be obtained.

Figure 7:
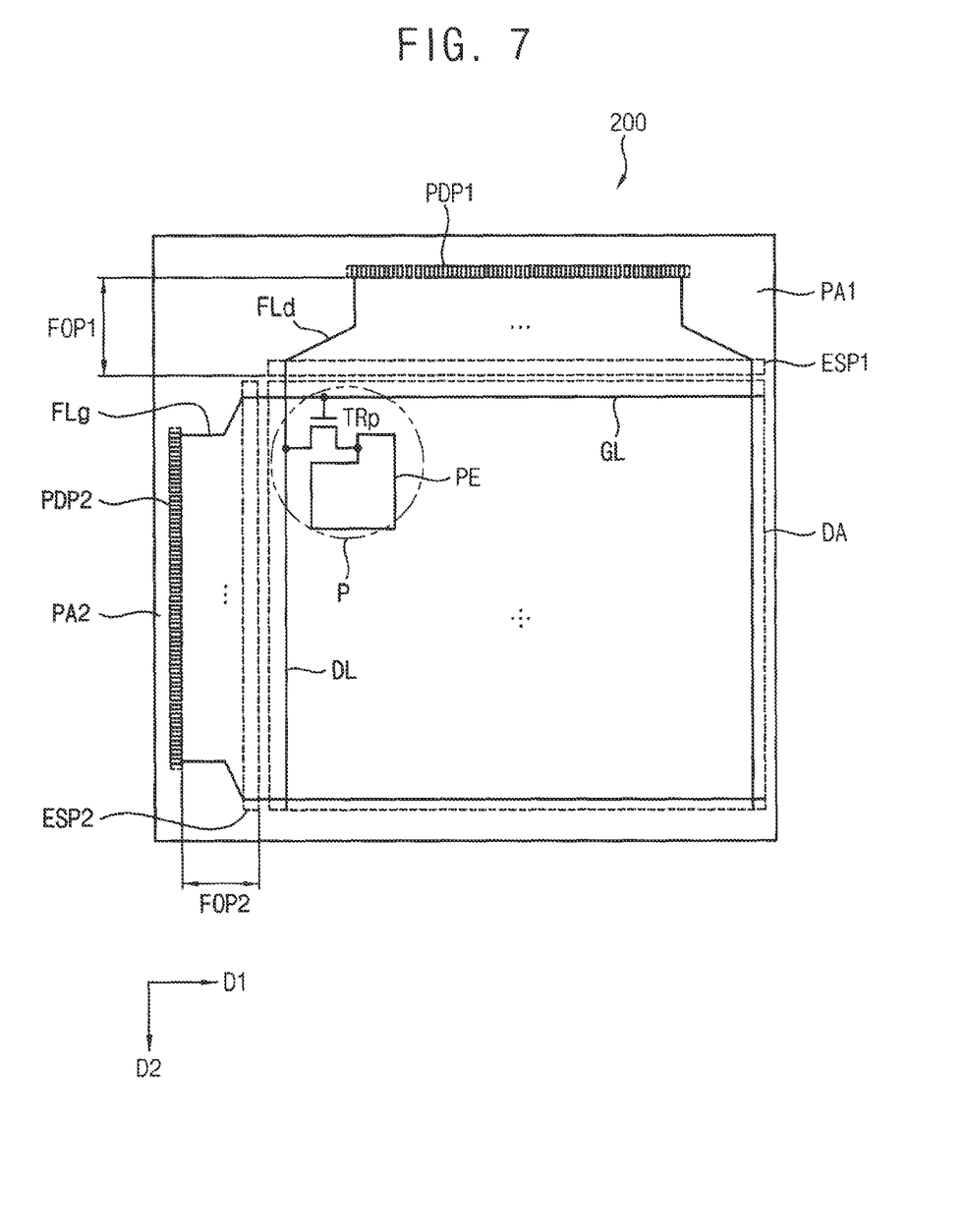
FIG. 7 is a plan view illustrating a display substrate according to an exemplary embodiment.

FIG. 7 is a plan view illustrating a display substrate according to an exemplary embodiment. Hereinafter, the same reference numerals are used to refer to the same or like parts as those described in the previous exemplary embodiments.

Referring to FIG. 7, the display substrate 200 includes a display area DA and first and second peripheral areas PA1 and PA2 surrounding the display area DA. The first peripheral area PA1 is adjacent to a first side portion of the display area DA and a second peripheral area PA2 is adjacent to a second side portion of the display area DA.

The display substrate 100 includes signal lines and pixels P which are disposed on the display area DA. The plurality of signal lines may include gate lines GL and data lines DL. The gate lines GL extend in a first direction D1 and are arranged in a second direction D2 crossing the first direction D1. The data lines DL extend in the second direction D2 and are arranged in the first direction D1. The pixels P are arranged as a matrix which includes pixel rows arranged in the second direction D2 and pixel columns arranged in the first direction D1. Each of the pixels P includes a pixel transistor TRp connected to a gate line GL and a data line DL, and a pixel electrode PE connected to the pixel transistor TRp.

The display substrate 200 includes the first peripheral area PA1 in which a first pad part PDP1, a first fan-out part FOP1, and a first static electricity breakup circuit ESP1 are disposed.

The first pad part PDP1 includes pads PD that are electrically connected to bumps of an external device. The external device mounted on the first pad part PDP 1 is an integrated circuit configured to drive the data lines DL.

The first fan-out part FOP1 includes first fan-out lines FLd that connect the pads of the first pad part PDP1 and the data lines DL.

The first static electricity breakup circuit ESP1 dissipates static electricity accumulated during manufacturing processes and driving processes, such that the data lines DL, the gate lines GL, and the pixel transistors TRp may be prevented from being damaged by the static electricity.

The first static electricity breakup circuit ESP1 includes static electricity prevention circuits that are connected to the first fan-out lines FLd. Each of the static electricity prevention circuits in the first static electricity breakup circuit ESP1 is substantially the same as those described in the previous exemplary embodiments referring to 2B to 4.

According to an exemplary embodiment, static electricity diodes connected to adjacent first fan-out lines FLd are commonly connected to the breakup line through the common contact part CC. Thus, the circuit area in which each of the static electricity prevention circuits is formed may be decreased. Therefore, in a high-resolution display apparatus having a narrow pixel distance PP may be obtained.

The display substrate 200 includes the second peripheral area PA2 in which a second pad part PDP2, a second fan-out part FOP2, and a second static electricity breakup circuit ESP2 are disposed. The second pad part PDP2 includes pads PD that are electrically connected to bumps of an external device. The external device mounted on the second pad part PDP2 is an integrated circuit configured to drive the gate lines GL.

The second fan-out part FOP2 includes second fan-out lines FLg that connect output pads of the second pad part PDP2 and the gate lines GL.

The second static electricity breakup circuit ESP2 dissipates static electricity accumulated during manufacturing processes and driving processes, such that the data lines DL, the gate lines GL, and the pixel transistors TRp may be prevented from being damaged by the static electricity.

The second static electricity breakup circuit ESP2 includes static electricity prevention circuits that are connected to the second fan-out lines FLg. Each of the static electricity prevention circuits in the second static electricity breakup circuit ESP2 is substantially the same as those described in the previous exemplary embodiments referring to 2B to 4.

According to an exemplary embodiment, static electricity diodes connected to adjacent second fan-out lines FLg are commonly connected to the breakup line through the common contact part CC. Thus, the circuit area in which each of the static electricity prevention circuits is formed may be decreased in size. Therefore, in a high-resolution display apparatus having a narrow pixel distance PP may be obtained.

As described above, according to exemplary embodiments, the static electricity diodes connected to fan-out lines adjacent to each other are commonly connected to the breakup line through the common contact part. Thus, the circuit area in which each of the static electricity prevention circuits is formed may be decreased in size. Therefore, in a high-resolution display apparatus having a narrow pixel distance may be obtained.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display substrate comprising:
    a base substrate comprising a display area and a peripheral area disposed outside of the display area;
    signal lines and pixels disposed in the display area;
    pads disposed in the peripheral area and configured to receive an electrical signal;
    fan-out lines connecting the pads and the signal lines;
    static electricity breakup circuits comprising:
        breakup lines that cross the fan-out lines; and
        static electricity prevention circuits that are each connected to a corresponding fan-out line, a pair of the static electricity prevention circuits being disposed between two adjacent fan-out lines; and
    common contact parts that each commonly connect a corresponding pair of the static electricity prevention circuits to a corresponding breakup line,
    wherein each of the static electricity prevention circuits comprises a first static electricity diode comprising:
        a first transistor comprising a first gate electrode and a first source electrode connected to a first fan-out line, and a first drain electrode connected to a first breakup line through a first common contact part; and
        a second transistor comprising a second gate electrode connected to the first breakup line, a second source electrode connected to the first fan-out line, and a second drain electrode connected to the first breakup line through the first common contact part,
    wherein the static electricity diodes of each pair of the static electricity prevention circuits are connected to the corresponding breakup line by the corresponding common contact part,
    wherein each of the static electricity prevention circuits further comprises a second static electricity diode connected to a second fan-out line disposed adjacent to the first fan-out line, the second static electrode diode comprising:
        a third transistor comprising a third gate electrode and a third source electrode connected to a second fan-out line, and a third drain electrode connected to the first breakup line through the first common contact part; and
        a fourth transistor comprising a fourth gate electrode connected to the first breakup line, a fourth source electrode connected to the second fan-out line, and a fourth drain electrode connected to the first breakup line through the first common contact part,
    wherein each of the static electricity prevention circuits further comprises a static electricity capacitor connected to the corresponding fan-out line, and
    wherein a first one of the static electricity capacitors comprises:

a fifth transistor that each comprises a gate electrode connected to a second breakup line;
a source electrode connected to the first fan-out line; and
a drain electrode connected to a sixth transistor of the first static electricity capacitor.

2. The display substrate of claim 1, wherein:
the first and third transistors are symmetrically disposed with respect to the first common contact part; and
the second and fourth third transistors are symmetrically disposed with respect to the first common contact part.

3. The display substrate of claim 1, wherein the first to fourth drain electrodes are directly connected to the first breakup line through a contact hole.

4. The display substrate of claim 1, wherein the first common contact part comprises a bridge electrode that connects the first to fourth drain electrodes of the first to fourth transistors and the first breakup line, through a contact hole.

5. The display substrate of claim 1, wherein the static electricity diodes connected are arranged in diode rows extending in a direction crossing the fan-out lines.

6. The display substrate of claim 1, wherein the static electricity capacitors are arranged in capacitor rows that cross the fan-out lines.

7. The display substrate of claim 1, wherein the first static electricity capacitor is disposed adjacent to at least one of both terminals of the first static electricity diode.

8. The display substrate of claim 1, wherein:
each of the pixels comprises a pixel transistor connected to a gate line and a data line, and a pixel electrode connected to the pixel transistor; and
the signal lines comprise data lines.

9. The display substrate of claim 1, wherein:
each of the pixels comprises a pixel transistor connected to a gate line and a data line, and a pixel electrode connected to the pixel transistor; and
the signal lines comprise gate lines.

10. The display substrate of claim 1, wherein a distance between a fan-out line and the corresponding common contact part is equal to a pixel distance between adjacent signal lines.

* * * * *